Feb. 2, 1937.                J. J. TATUM                2,069,688
                    CUSHIONING MEANS FOR VEHICLES
                    Filed July 23, 1935        6 Sheets-Sheet 1
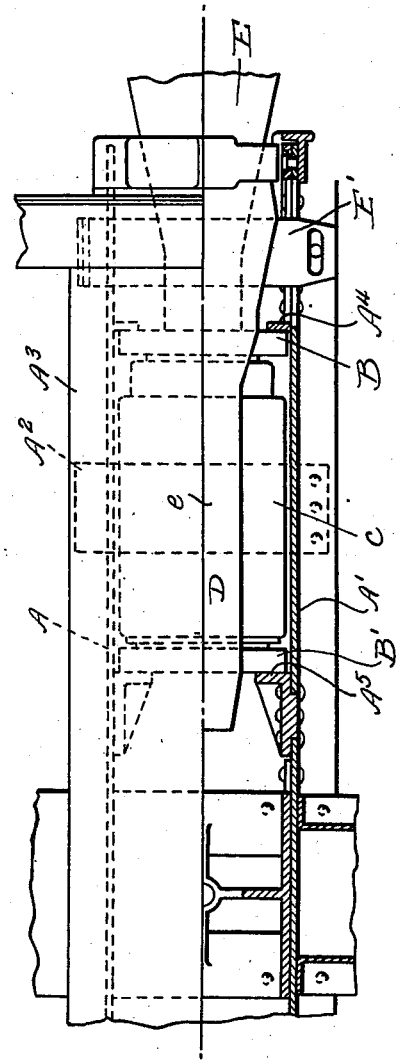
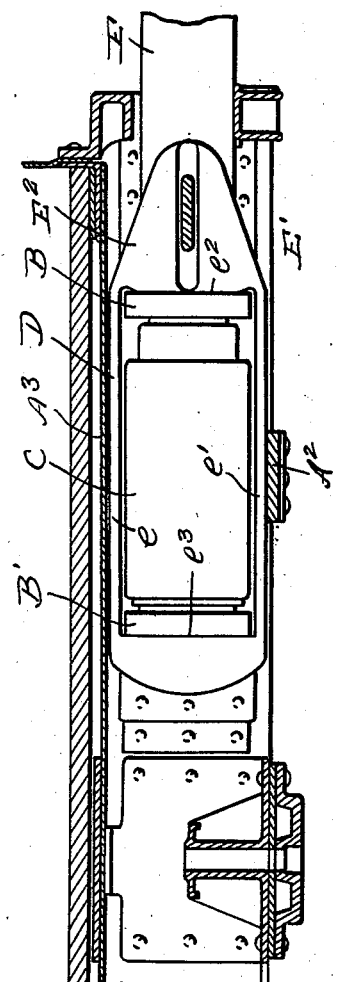
Inventor
John J. Tatum
By [signature]
Attorney Feb. 2, 1937.   J. J. TATUM   2,069,688
CUSHIONING MEANS FOR VEHICLES
Filed July 23, 1935   6 Sheets-Sheet 2
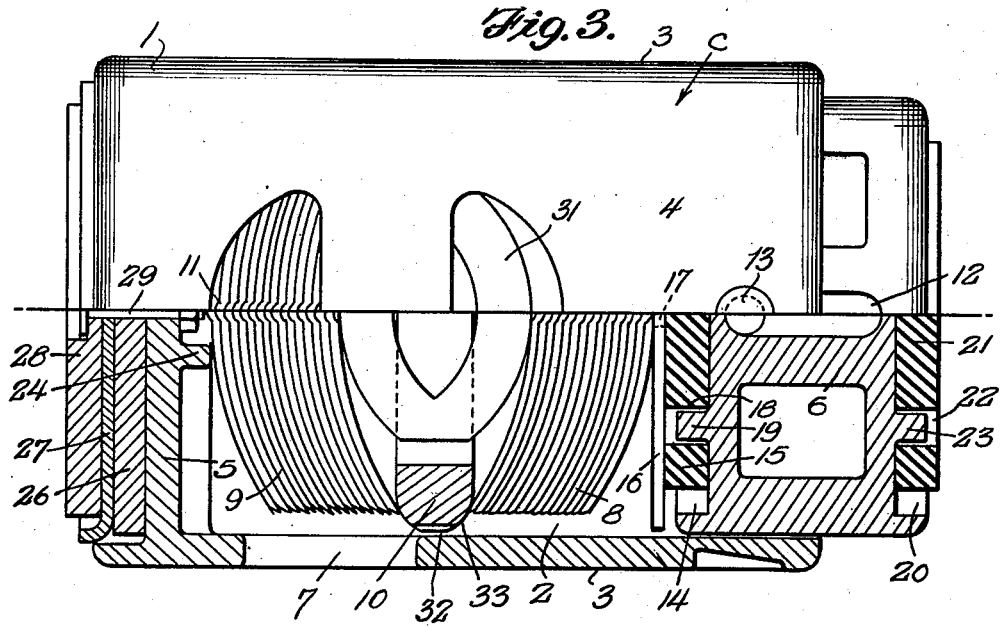
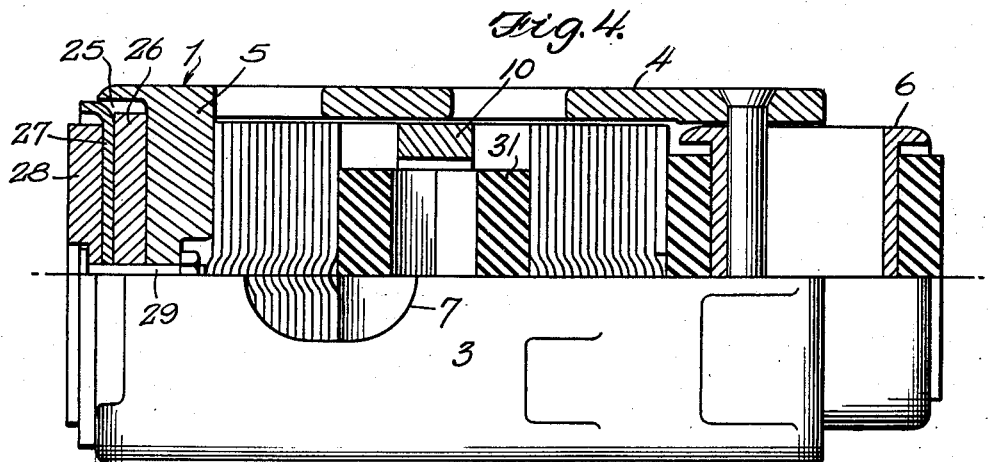
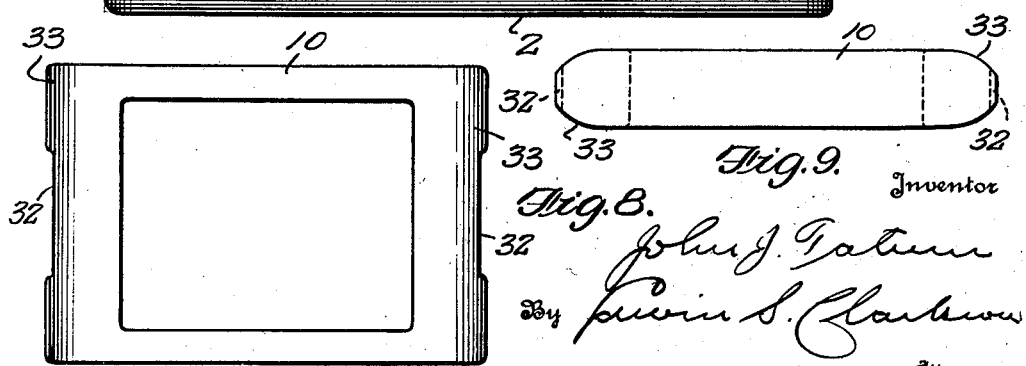

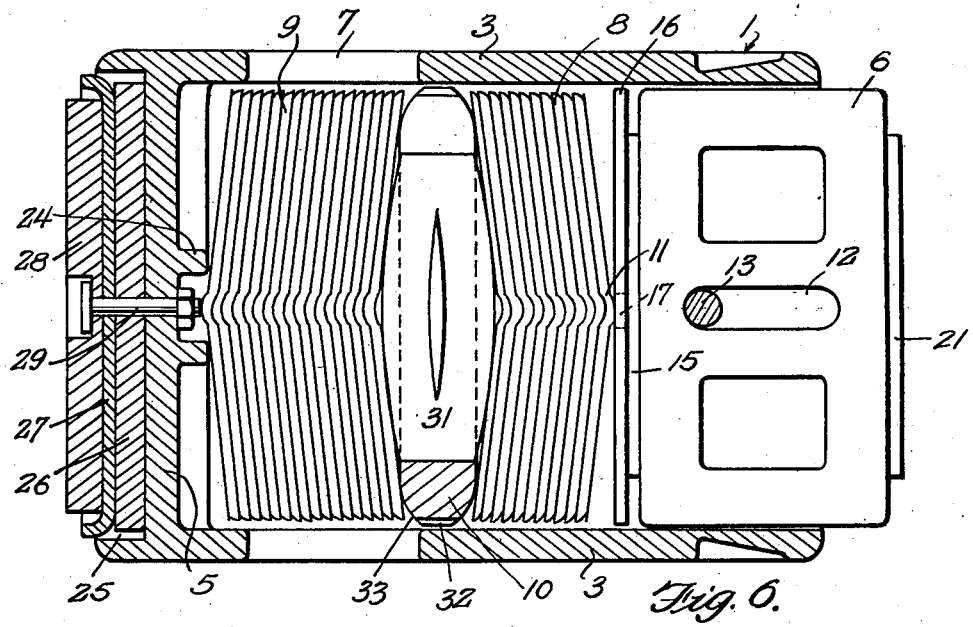

Feb. 2, 1937. J. J. TATUM 2,069,688
CUSHIONING MEANS FOR VEHICLES
Filed July 23, 1935  6 Sheets—Sheet 4

Inventor
John J. Tatum
By [signature]
Attorney

Feb. 2, 1937.  J. J. TATUM  2,069,688
CUSHIONING MEANS FOR VEHICLES
Filed July 23, 1935   6 Sheets-Sheet 5
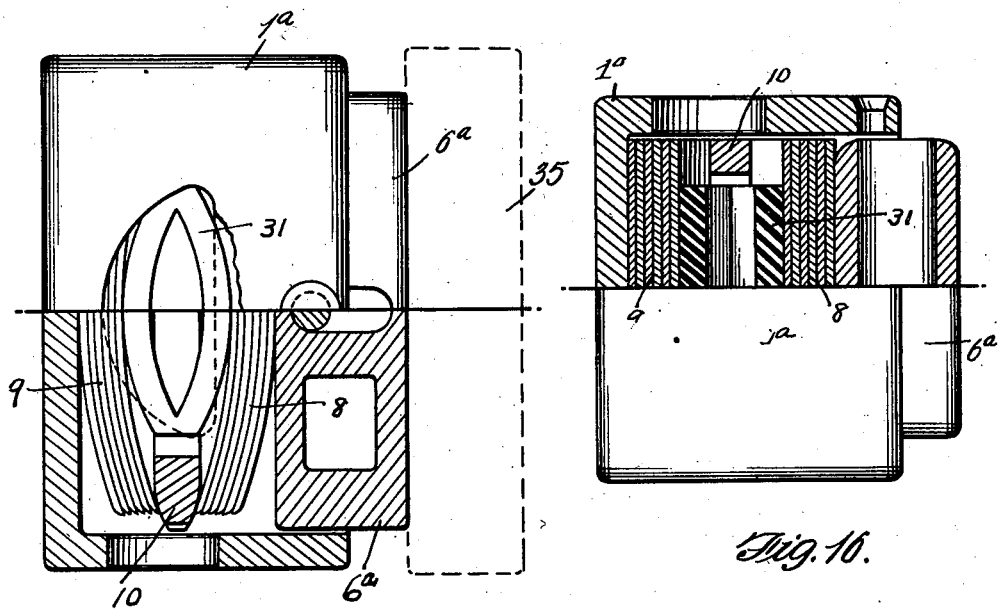
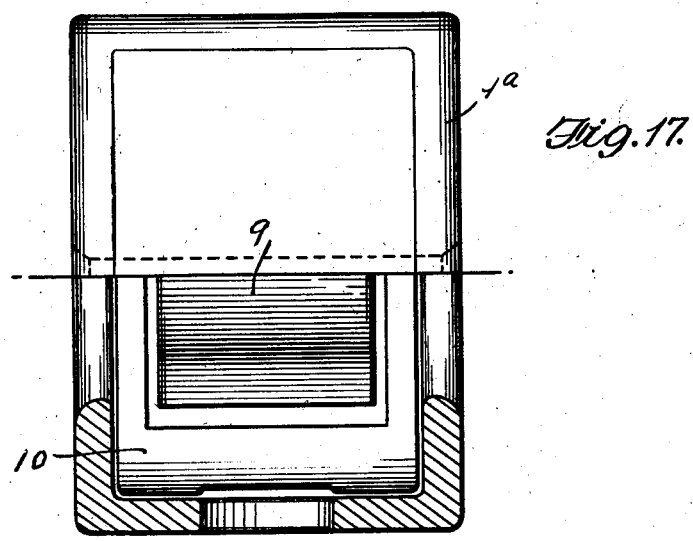

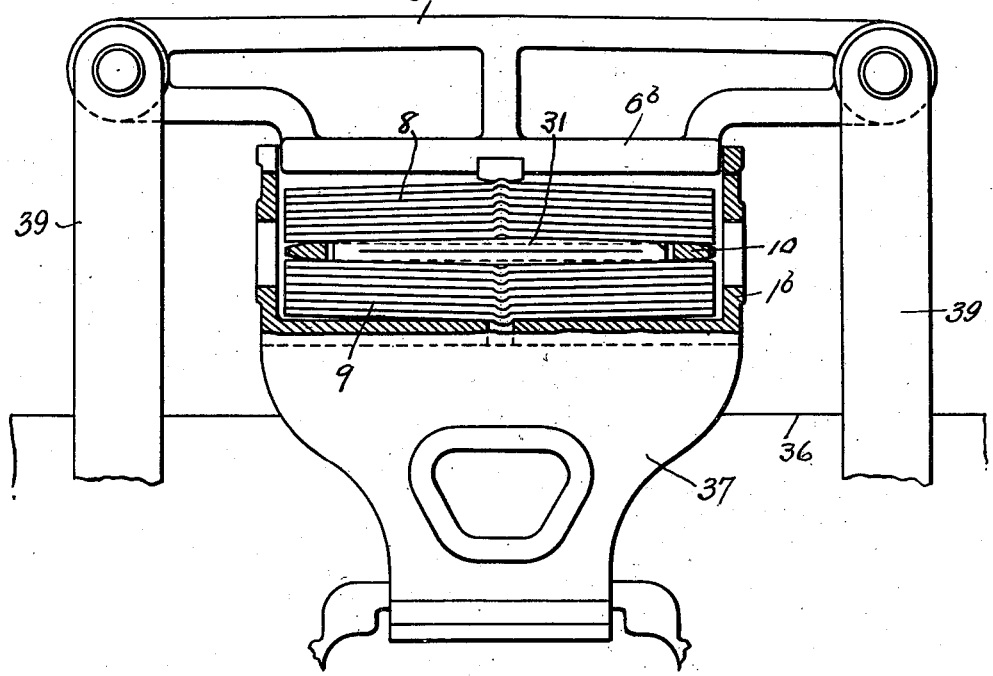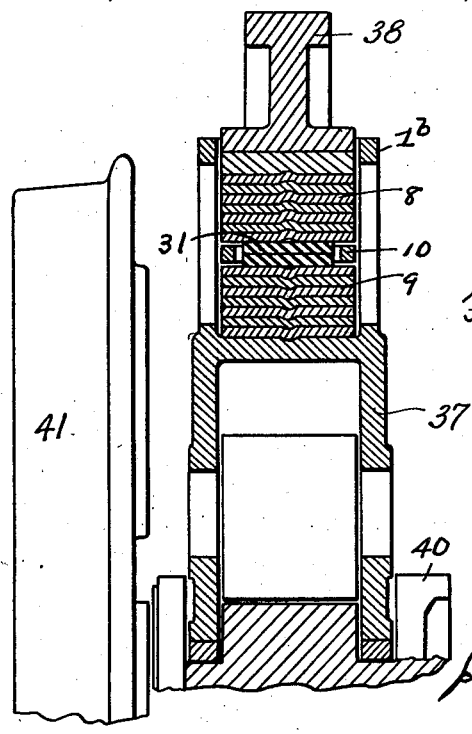

Patented Feb. 2, 1937

2,069,688

UNITED STATES PATENT OFFICE 2,069,688

CUSHIONING MEANS FOR VEHICLES

John J. Tatum, Baltimore, Md.

Application July 23, 1935, Serial No. 32,803

14 Claims. (Cl. 213—30)

This invention relates to cushioning means for vehicles, and particularly to cushioning means for car and locomotive tender drawbars, car and locomotive truck bolsters and locomotive spring riggings. More particularly the invention relates to cushioning means of that general type employing loose arch shaped or semi-elliptically curved spring plates to give or to assist in giving the cushioning effect.

The primary object of the invention is to provide high capacity rubber cushioning means cooperating with spring cushioning means in such manner as to secure a more efficient, reliable and higher degree of cushioning action than has been possible with prior constructions and to obtain a quick release of the cushioning means to a full release position.

A further object of the invention is to provide a novel construction of high capacity rubber spring and coacting parts whereby a quick releasing cushioning means of great shock absorbing capacity is produced.

A still further object of the invention is to provide cushioning means which by slight changes in form, construction or proportions of assembly parts is adaptable for use in cushioning car and locomotive tender drawbars, car and locomotive tender bolsters, locomotive spring riggings and other parts or appurtenances of vehicles for shock absorbing and cushioning actions.

With these and other objects in view, the invention consists of the features of construction, combination and arrangement of parts, hereinafter fully described and claimed, reference being had to the accompanying drawings, in which:—

Fig. 1 is a top plan view, partly in section, of a portion of a draft gear of a railway car, showing the application of my invention thereto.

Fig. 2 is a vertical longitudinal section of the same.

Fig. 3 is a view, partly in side elevation and partly in vertical longitudinal section, on an enlarged scale, of the cushioning means per se.

Fig. 4 is a view, partly in top plan and partly in horizontal section, of the same.

Fig. 5 is an outer end elevation, partly in vertical transverse section, of the cushioning means.

Fig. 6 is a vertical section through the cushioning means showing the springs in substantially fully compressed condition.

Fig. 7 is a vertical transverse section through the housing looking toward the inner end thereof.

Figs. 8 and 9 are, respectively, a side elevation and an end elevation, partly in section, of the separator plate.

Figure 10:
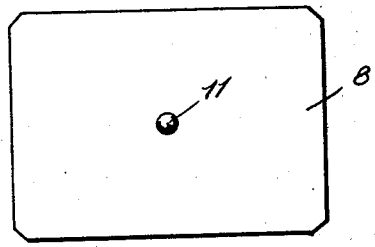
Fig. 10 is an outer side elevation of one of the elliptical spring plates.
Figure 12:
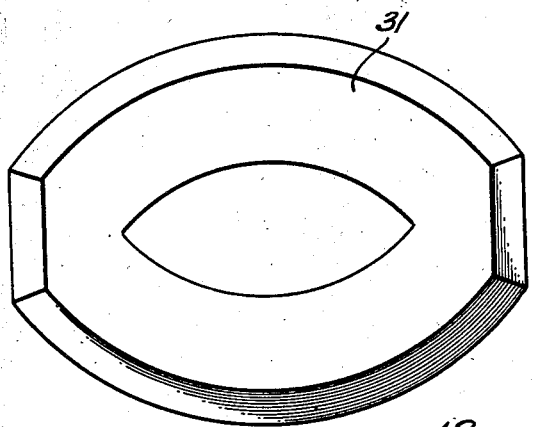
Figure 11:
Fig. 11 is a sectional view through one of the sets of spring plates.
Figure 14:
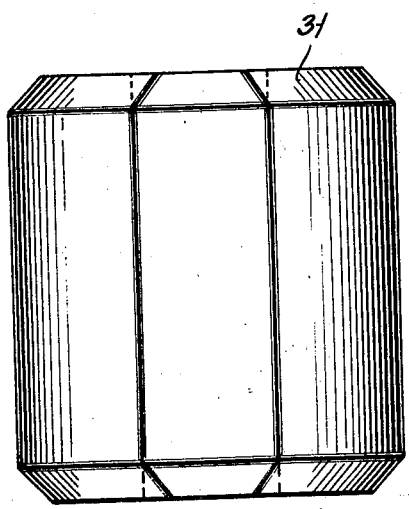
Figure 13:
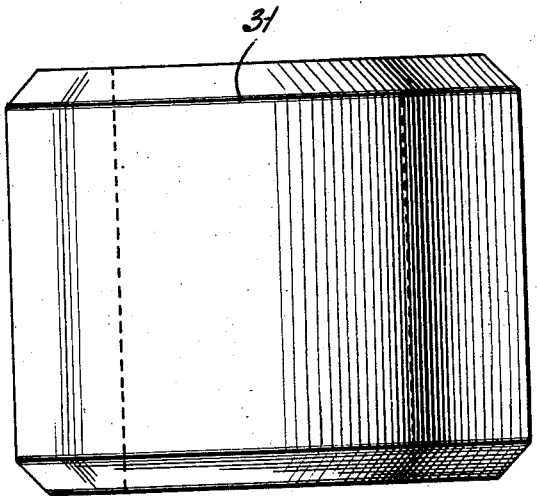

Figs. 12, 13, and 14 are, respectively, a side elevation, a top plan view and an end elevation of the semi-elliptical rubber spring.

Figs. 15, 16, and 17 are, respectively, a side elevation partly in vertical section, an end elevation partly in vertical section, and a top plan view partly in horizontal section, of the cushioning means as employed for supporting and cushioning a car truck bolster.

Fig. 18 is a view in side elevation, the cushioning means appearing in section, showing the application of the invention to a locomotive driver spring rigging, the cushioning springs being compressed as under maximum load.

Fig. 19 is a section on line 19—19 of Fig. 18.

Referring now more particularly to Figs. 1 to 14, inclusive, of the drawings, in which the cushioning means is shown applied to the draft and buffing gear of a railway car, A and A' represent longitudinal frame members forming a part of the substructure of the car body, $A^2$ a transverse plate connecting said members at their lower portions, $A^3$ a cover plate above the space between the members, $A^4$ and $A^5$ front and rear stops for the draft gear secured to the members A, A', B and B' are front and rear follower plates which respectively engage the front and rear stops $A^4$ and $A^5$, C represents the cushioning means constructed in accordance with the present invention disposed between said follower plates, D a yoke embracing the follower plates and the cushioning means, and E a drawbar coupled by a transverse pin or key E' to the yoke by engagement of the ends of the pin in the slotted yoke arms $E^2$, all of which parts with the exception of the cushioning means may be of the ordinary or any approved construction. The yoke is provided with an upper longitudinal member $e$, a lower longitudinal member $e'$, a front wall or shoulder $e^2$, which engages the front follower, and a rear wall or shoulder $e^3$ which engages the rear follower.

The cushioning and shock absorbing means C embodying my invention is arranged between the follower plates B and B' and comprises a casing or housing 1 of oblong rectangular form and having a bottom wall 2, side walls 3, a top wall 4, and rear end wall 5, said casing being open at its front end to slidably receive a follower 6. The housing 1 is slidably mounted for movements with the yoke and its wall 5 and follower 6 form relatively fixed front and rear abutment surfaces. The wall 5 may be either perforate or imperforate, but, as herein shown, this wall and the side and top walls are either of skeleton formation or provided with openings 7 of suitable size, shape and location to permit of the ready and convenient introduction of the contained cushioning elements, hereinafter described, without the necessity of inserting and removing the same from an end of the housing and disturbing parts of the draft gear.

Arranged within the housing are two sets of opposed shock absorbing and cushioning springs 8 and 9. Each of these sets of springs consists of a bank of nested metallic spring plates of any suitable size, number and capacity to provide the degree of shock absorbing and cushioning action desired. The sets of springs are held spaced from each other by an intermediate metallic separator plate 10, the concaved sides of the springs facing toward said plate and the top and bottom edges of the innermost plate of each set being arranged to bear against the opposed faces of the separator plate. Each semi-elliptical spring plate is preferably of generally oblong rectangular form and the plates of each set are held loosely in engagement with each other by indented or offset portions 11 forming interengaging nibs and recesses which hold the plates in proper relationship while permitting free expanding and contracting movements thereof under compression and release from compression.

The follower 6 comprises a block or body which has a predetermined extent of movement in the housing, and for this purpose is provided with a transverse guiding and retaining slot 12 through which and the side walls of the casing passes a fastening pin, bolt or rivet 13 which allows the follower to have free movements to the predetermined extent, while holding it from disconnection from the housing. The inner face of the follower may bear directly against the convex side of the outermost spring of the set 8, if desired, but in practice, and as herein shown, such face of the floor is formed with a channel or recess 14 receiving a cushioning pad or block 15 of high capacity rubber. A metallic separator plate 16 bears against this rubber pad or block and forms a wear plate holding the rubber pad or block spaced from the outermost spring of the set 8, said plate 16 being provided with a seat recess or opening 17 therein to receive the nib of said outermost spring, whereby the plate and springs are held accurately centered. The rubber pad or block 15 may be held centered in the channel or recess 14 by any suitable means, as by providing the same with openings or recesses 18 to receive bolt-like projections 19 upon the follower. The outer face of the follower is also preferably provided with a channel or recess 20 receiving therein a rubber cushioning pad or block 21 provided with recesses or openings 22 receiving bolt-like projections 23 on the follower, whereby said pad or block is held centered in position. This pad or block 22 engages the follower plate B and forms a yielding or cushioning member between said follower plate of the draft gear and the follower of the cushioning means.

The convex face of the outermost spring of the set of springs 9 is arranged to bear directly against an annular seat flange 24 on the inner face of the wall 5 of the housing 1, said flange providing a retaining seat or recess receiving the nib of said spring plate, whereby said plate is held centered and in proper bearing contact with the wall 5. This wall 5 is preferably provided upon its outer face with a recess or channel 25 receiving an inner rubber cushioning pad or block 26. On the outer side of this cushioning block or pad 26 is disposed a cup-shaped or dished metallic wear and retaining plate 27, within the depression of which is fitted an outer rubber cushioning pad or block 28 which contacts with the follower plate B' of the draft gear structure. A bolt 29 passes through the pads 26 and 28, the plate 27 and the wall 5 and secures said pads and plate to said wall. The seat recesses in which the blocks or pads 21, 26 and 28 are fitted are preferably of larger surface dimensions than the pads so as to permit the rubber of the pads to flow as the pads flatten out under load, thus assuring a maximum cushioning effect being obtained. The use of these pads or cushions of high capacity rubber upon the wall or abutment 5 of the housing 1 and the follower or movable abutment 6 gives an increased velvety cushioning action to assist the draft gear and the cushioning means within the housing 1 in absorbing shocks and jars, particularly at the limits of shock absorbing movements, which might otherwise be transmitted to the gear, so that a velvety cushioning action of maximum character will be obtained.

The separator plate 10 is of apertured type or provided with an opening 30 therein, in which opening is fitted an elliptical shock absorbing spring 31, made of high capacity rubber. This rubber spring is of hollow center type, that is, has a slot or opening extending transversely through it between its opposed semi-elliptical portions. This rubber spring is arranged in the opening of the separator plate so that its opposed semi-elliptical portions project outwardly beyond opposite sides of the separator plate with their convex surfaces engaging the concaved faces of the innermost plates of the sets of metallic spring plates 8 and 9, and so that all three springs 8, 9, and 31 will under compression and reaction be in a state of full compression or full reaction at the same time. The rubber elliptical spring is formed of high capacity rubber, of a capacity commensurate with the cushioning unit of which it forms a part and with proper regard to the capacity of the semi-elliptical metallic spring plates with which it coacts. The function of this rubber spring is to add a pronounced resistance to compression of the sets of spring plates of a uniform elastic character and free from resistance irregularities, thereby increasing the capacity of the cushioning means to resist shocks and jars to any high degree desired, while at the same time securing a uniform and soft or velvety cushioning action. The semi-elliptical rubber spring also serves the desired function of imparting a quick release action to the cushioning means when compression is removed therefrom, to an extent impossible to secure in the use of the metallic springs alone. The draft gear assembly herein shown is adapted for use upon railway cars, may be of such capacity as to have an initial compression of from five to ten thousand static pounds, the spring assembly 8, 9, and 31, a shock absorbing capacity between zero and seven hundred thousand static pounds, and the addition of the high capacity rubber pads may be such as to make the total shock absorbing capacity of the cushioning unit over one million static pounds, thus giving a shock absorbing capacity which is enormously increased over other draft gears of this type heretofore used or suggested, and which at the same time is of a soft, elastic or velvety character. In practice, the separator plate 10 is preferably provided at its top and bottom edges with notched out portions 32 to reduce its bearing contact with the top and bottom walls of the housing, and the opposed faces of the plate are provided at their upper and lower edges with relatively converging and curved friction surfaces 33 against which the upper and lower edges of the innermost spring plates of the sets 8 and 9 bear and on which they may ride in their contracting and expanding movements, so that a free and unimpeded cushioning action of the springs without resistance from the separator plate is obtained.

As shown, the shock absorbing unit embodying my invention is arranged between the abutment plates B and B' of the draft and buffing gear of the car so as to cushion said gear in its movements, and it will be evident that the use of this unit gives an enormously increased range of shock absorbing action as well as an increased velvety action to assist the draft gear in absorbing shocks and jars which otherwise might be transmitted to the car. In an ordinary draft gear structure, the convention of draft gears is considered solid when the movable follower touches either of the four corners of the housing. This is not the case with my improved cushioning unit for the reason that when the followers B—B' contact any corner of the housing the rubber cushions forming part of the unit will yield until all four corners of the housing at its ends is engaged by the followers B—B', the followers thus having an articulating compensating action, so that in the use of this unit the gear is not solid until the housing engages the followers at all four bottom and top corners, at which time the gear will be solid and will cease to yield further. It will be seen that this compensating action also extends the cushioning range of the draft gear to a still further extent.

In Figs. 15, 16, and 17 I have shown the application of the invention to a car bolster truck structure for the purpose of yieldingly supporting the bolster, the housing Ia in this structure being suitably mounted upon the truck frame 34 and the follower 6a being arranged to form a yielding support for the bolster 35. The construction and arrangement of the internal cushioning parts in this adaptation of the invention, to wit, the metallic semi-elliptical springs, separator plate and rubber elliptical cushioning spring, is substantially the same as that previously disclosed with reference to Figs. 1 to 4, inclusive, so that a detailed description of the cushioning elements is unnecessary. The cushioning pads and wear plates employed in the cushioning units shown in Figs. 1 to 14, inclusive, are omitted in the structure shown in Figs. 15, 16, and 17, but may be employed if desired. The operation of the cushioning means in cushioning the movements of the bolster will be readily understood from the foregoing description.

In Figs. 18 and 19 I have shown the application of the invention to a locomotive driver spring rigging, in which 36 represents the engine frame, 37 the saddle, 38 the equalizer, 39 the hangers, 40 the axle box and 41 a locomotive wheel. The casing or housing Ib of the cushioning unit here is carried by the saddle and may be formed integral therewith in the general shape of a spring pocket. The follower 6b in this construction is shown as carried by the equalizer 38 and may form a component part thereof. Within the casing, housing or spring pocket Ib are arranged cushioning springs and a separator of the type previously described for cushioning the movements of the follower 6b. The drawing in this case shows the metallic and rubber springs in substantially a fully compressed condition and with the follower at the limit of its cushioning movement. The construction and operation of this adaptation of the invention will be readily understood from the foregoing description and without a further and extended description, and it will be seen that the advantages obtained by the use of the cushioning elements, as previously set forth, will also be secured in this construction.

It will, of course, be understood that while the structural forms of the invention disclosed, for purposes of exemplification, are preferred, changes in the form, arrangement and details of construction of the parts may be made within the scope of the appended claims without departing from the spirit or sacrificing any of the advantages of the invention.

What I claim is:—

1. A cushioning and shock absorbing means of the character described comprising relatively movable elements to be cushioned, opposed metallic elliptical spring between said elements, a movable apertured separator between the opposed metallic elliptical springs, and a hollow rubber elliptical spring projecting through the apertured separator and coacting with said metallic elliptical springs for shock absorbing and cushioning actions.

2. A cushioning and shock absorbing means of the character described comprising relatively movable elements to be cushioned, sets of opposed semi-elliptical metallic springs between said elements, a movable apertured separator between the metallic springs, and a hollow rubber elliptical spring extending through the apertured separator and interposed between the sets of metallic springs for coaction therewith.

3. A cushioning and shock absorbing means of the character described comprising relatively movable elements to be cushioned, opposed metallic elliptical springs between said elements, a movable apertured separator between the opposed metallic elliptical springs and having friction surfaces slidably engaging one of the elements, and a hollow rubber elliptical spring projecting through the apertured separator and coacting with said metallic elliptical springs for shock absorbing and cushioning actions.

4. A cushioning and shock absorbing means of the character described comprising relatively movable elements to be cushioned, opposed metallic elliptical springs between said elements, a movable apertured separator between the opposed metallic elliptical springs, a hollow rubber elliptical spring disposed between the metallic elliptical springs and extending through the apertured separator, a second separator between one of the elements to be cushioned and one of the metallic elliptical springs, and an elastic cushioning body between said second separator and said element.

5. A cushioning and shock absorbing means of the character described comprising relatively movable elements to be cushioned, sets of opposed semi-elliptical metallic springs between said elements, a movable apertured separator between the metallic springs, a hollow rubber elliptical spring extending through the apertured separator and interposed between the sets of metallic springs for coaction therewith, a second separator between one of the elements to be cushioned and one of the sets of metallic springs, and an elastic cushioning body between said second separator and said element.

6. In a cushioning and shock absorbing means, the combination of a housing forming a movable member to be cushioned, a follower in the housing forming an opposed member to be cushioned, metallic elliptical springs in the housing respectively opposing movements of the members toward each other, an apertured separator in the housing between the metallic springs, and a rubber elliptical spring extending through the apertured separator and backing the opposed metallic elliptical springs.

7. In a cushioning and shock absorbing means, the combination of a housing forming a movable member to be cushioned, a follower in the housing forming an opposed member to be cushioned, metallic elliptical springs in the housing respectively opposing movements of the members toward each other, an apertured metallic follower plate disposed in the housing between the metallic elliptical springs and having friction surfaces slidably engaging the housing, and a rubber elliptical spring extending through the apertured separator and backing the opposed metallic elliptical springs.

8. In a shock absorbing and cushioning means, the combination of two abutment members, one abutment member being formed as part of a housing and the other abutment member being in the form of a follower movable in the housing, sets of metallic elliptical springs in the housing and associated with the respective abutments, an apertured separator plate in the housing between said abutments, and a hollow center elliptical rubber spring interposed between the sets of metallic springs and projecting through the aperture in the separator.

9. In a shock absorbing and cushioning means, the combination of two abutment members, one abutment member being formed as part of a housing and the other abutment member being in the form of a follower movable in the housing, sets of metallic elliptical springs in the housing and associated with the respective abutments; an apertured separator plate in the housing between said abutments, cushioning means between one of said sets of springs and the follower, and a hollow center elliptical rubber spring interposed between the sets of metallic springs and projecting through the aperture in the separator.

10. In a shock absorbing and cushioning means, the combination of two abutment members, one abutment member being formed as part of a housing and the other abutment member being in the form of a follower movable in the housing, sets of metallic elliptical springs in the housing and associated with the respective abutments, an apertured separator plate in the housing between said abutments, a second separator plate in the housing between one of the sets of metallic springs and the follower, a rubber cushioning pad between said second separator and the follower, and a hollow center elliptical rubber spring interposed between the sets of metallic springs and projecting through the aperture in the separator.

11. In a draft gear having abutments movable toward and from each other, a housing having an abutment and a follower respectively engaging the first-named abutments, sets of opposed metallic semi-elliptic springs in the housing coacting with the abutment and follower thereof, an apertured separator in the housing between the sets of springs, and a rubber elliptical spring projecting through the aperture in the separator and disposed between and coacting with said sets of metallic springs.

12. In combination with relatively movable members to be cushioned, cushioning means disposed between said members and comprising a housing carried by one of said members, a follower therein, a movable apertured separator in the housing, sets of metallic semi-elliptic springs in the housing and disposed respectively between the separator and the bottom of the housing and between the separator and the other of said members, and a rubber elliptical spring projecting through the aperture in the separator and disposed between and coacting with said sets of metallic springs.

13. In a cushion spring structure, a supporting member, a spring pocket thereon, a second supporting member, a follower sustaining said second supporting member and movable in said pocket, a movable apertured separator in the pocket, sets of metallic semi-elliptic springs in the pocket on opposite sides of the separator and between the separator and a wall of the pocket and between the separator and the follower, and a rubber elliptical spring projecting through the aperture in the separator and disposed between and coacting with said sets of metallic springs.

14. A cushioning and shock absorbing means of the character described comprising relatively movable elements to be cushioned, an apertured follower disposed between said elements and freely movable between the same, sets of floating metallic semi-elliptical cushioning springs arranged between the follower and the respective elements, the springs of the set having free edges frictionally engageable with each other and with the follower for free expanding and contracting actions of the springs, and a rubber spring disposed in the aperture of the follower and engaging the sets of metallic semi-elliptical springs, the aperture in the separator permitting floating movement of said elliptical rubber spring and flow of the rubber thereof for expanding and contracting actions.

JOHN J. TATUM.